3,839,435
PROCESS FOR PRODUCING FIBER GRADE TEREPHTHALIC ACID
Motoo Shigeyasu, Kenzo Kuihara, and Michio Kuki, Matsuyama, Japan, assignors to Maruzen Oil Co., Ltd., Tokyo, Japan
Filed Jan. 14, 1972, Ser. No. 217,841
Int. Cl. C07c 51/20, 63/02, 63/26
U.S. Cl. 260—524 R
28 Claims

ABSTRACT OF THE DISCLOSURE

The process for directly producing fiber grade terephthalic acid suitable as a raw material for preparing a high-quality polyester for synthetic fibers by a so-called direct polymerization process, wherein the liquid-phase oxidation reaction of p-xylene is conducted while supplying p-xylene into the reaction system through not less than three inlets distributed in the vertical direction in the reaction vessel and stirring the reactants.

BACKGROUND OF THE INVENTION

Field of the Invention

The present invention relates generally to a process for the production of terephthalic acid and, more particularly, it relates to a process for directly producing fiber grade terephthalic acid suitable as a raw material for a so-called direct polymerization process, i.e., a process of preparing a high-quality polyester for synthetic fibers by the direct reaction of the terephthalic acid and ethylene glycol or ethylene oxide without any purifying procedures, by conducting the liquid-phase oxidation reaction of p-xylene while supplying p-xylene into the reaction system by a specific manner and stirring the reactants.

Description of the Prior Art

It has widely been employed in industry to produce terephthalic acid by oxidizing an alkylated aromatic hydrocarbon such as p-xylene in a liquid phase with molecular oxygen under heating and under pressure in the presence of a heavy metal-containing oxidation catalyst and a solvent such as acetic acid. However, the terephthalic acid produced by such a liquid-phase oxidation reaction contains such reaction intermedaite products and by-products as 4-carboxybenzaldehyde and p-toluylic acid and from such a crude terephthalic acid a high-quality polyester cannot be obtained by the direct polymerization reaction with ethylene glycol or ethylene oxide. Accordingly, in order to produce a high-quality polyester from such a crude terephthalic acid, a method in which the crude terephthalic acid is once esterified to provide dimethyl terephthalate and after purifying dimethyl terephthalate the high-quality polyester is produced by the ester-exchange reaction with ethylene glycol or ethylene oxide is employed. In the case of employing no such esterification step, it is required to purify the crude terephthalic acid by such various purification methods as recrystallization and purification by hydrogenation to such a purity that the terephthalate can be used for obtaining a high-quality polyester by the direct polymerization reaction thereof with ethylene glycol or ethylene oxide.

Therefore, if high grade terephthalic acid which can be used for producing a high-quality polyester by the direct polymerization thereof with ethylene glycol or ethylene oxide can be obtained directly by only the oxidation reaction without the above-mentioned complicated esterification step or the purification step, the industrial and economical values thereof are quite large.

Thus, for obtaining terephthalic acid having improved quality by the liquid-phase oxidation reaction of p-xylene, various studies and attempts have been made about the improvements of the reaction conditions, the compositions of catalysts, and the structures of reaction apparatus.

For example, in the specification of U.S. Patent No. 3,507,913, a process is described for producing fiber grade terephthalic acid by conducting the liquid-phase oxidation reaction of p-xylene in a specific combination of reaction zone and precipitating zone. However, the process requires the complicated and economically disadvantageous step of adding a large amount of acetic acid freshly to the reaction product while maintaining the reaction product (withdrawn from the reaction system) at a specific temperature. And further the terephthalic acid obtained in this process having molar extinction coefficient ($\epsilon$ 380 m$\mu$) of about 0.03 is insufficient for providing a product having satisfactory qualities.

At present, satisfactory and industrially applicable processes of producing directly by only a liquid-phase oxidation reaction the terephthalic acid having a proper quality for providing a high-quality polyester by the direct polymerization with ethylene glycol or ethylene oxide has not been reported.

SUMMARY OF THE INVENTION

The inventors have investigated in detail the process of producing terephthalic acid by oxidizing p-xylene in a liquid phase with a molecular oxygen in the presence of a heavy metal-containing oxidizing catalyst and a lower aliphatic carboxylic acid type solvent. As a result thereof, the inventors have discovered that the quality of the terephthalic acid thus produced is greatly influenced by the manner of supplying p-xylene into the reaction zone as the feed material. That is, the inventors have discovered the novel fact that by conducting the liquid-phase oxidation reaction of p-xylene while supplying the p-xylene into the reaction system through a least three inlets located or distributed in the vertical direction in the reaction vessel and stirring the reatcants, the quality of the terephthalic acid produced is greatly improved as compared with that of the terephthalic acid obtained by a conventional oxidation method in which p-xylene is supplied into the reaction system through one inlet, and that fiber grade terephthalic acid suitable as a raw material for producing high-quality polyester by the direct polymerization thereof can be obtained directly by only the oxidation reaction of p-xylene.

An object of this invention is, therefore, to provide a process of producing directly in one step by only the liquid-phase oxidation reaction of p-xylene fiber grade terephthalic acid suitable as a raw material in a so-called direct polymerization method, i.e., a process of producing high-quality polyester for synthetic fibers by the direct polymerization with ethylene glycol or ethylene oxide.

Another object of this invention is to provide a process for directly producing fiber grade terephthalic acid by an oxidation reaction without purification step after the oxidation process.

Still another object of the present invention is to provide a process for producing fiber grade terephthalic acid by conducting the liquid-phase oxidation of p-xylene while feeding the feed material in the reaction system in a specific manner and stirring the reactants.

Still another object of this invention is to provide a process for producing advantageously in the industry with economy fiber grade terephthalic acid at a high yield.

Other objects and advantages of the present invention will become apparent by the following detailed description.

Thus, according to the present invention, there is provided a process for producing fiber grade terephthalic acid by oxidizing p-xylene in a liquid phase with molecular oxygen or a molecular oxygen-containing gas in the presence of a heavy metal-containing catalyst and a lower aliphatic carboxylic acid as the solvent, which comprises conducting the above-mentioned oxidation reaction while continuously supplying the feed material, p-xylene into the reaction system through at least three inlets located or distributed in the vertical direction of the reaction vessel and stirring the reactants.

DETAILED DESCRIPTION OF THE INVENTION

Figure 1:
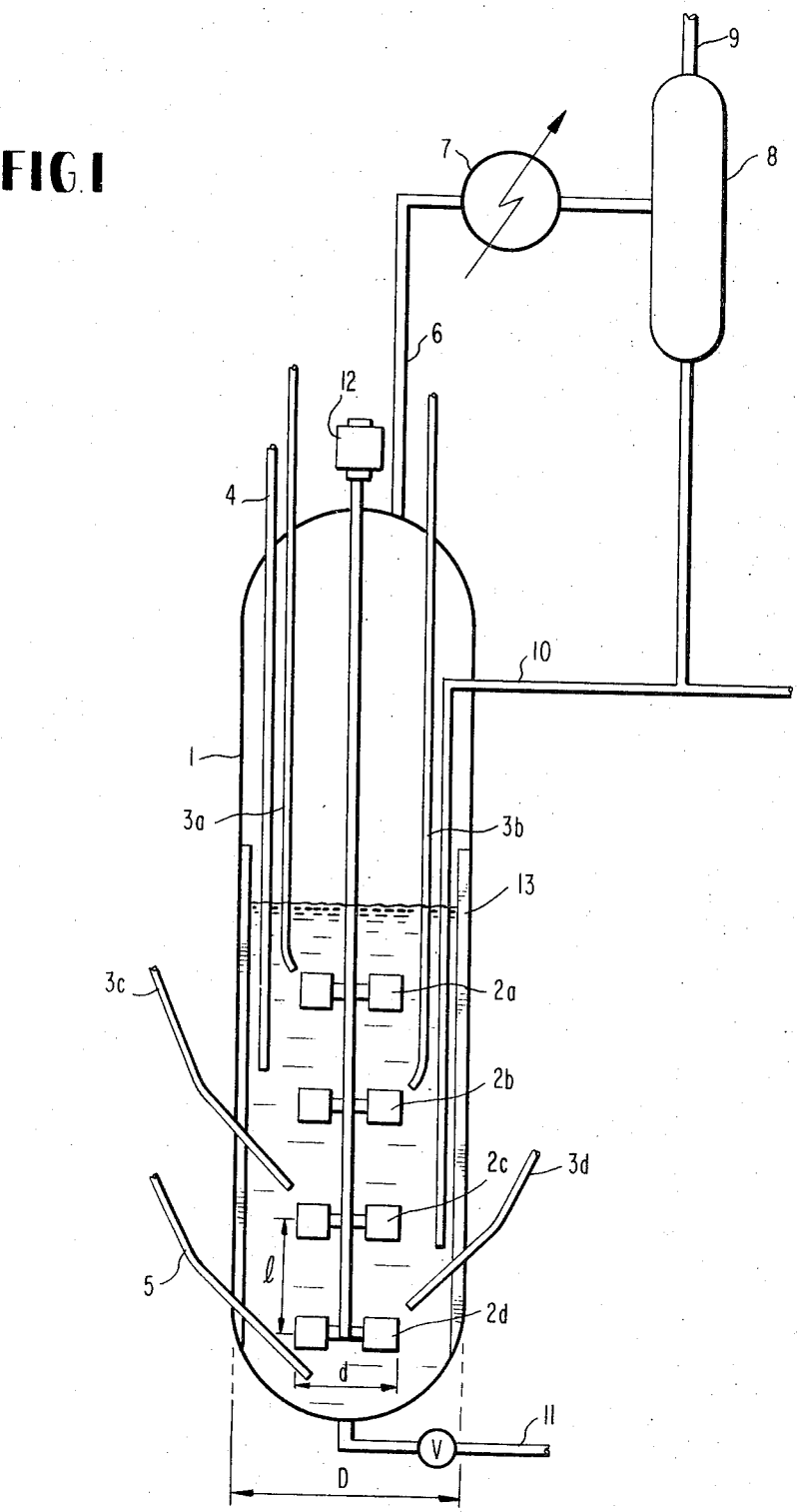
FIG. 1 is a schematic cross-sectional view showing an embodiment of a reaction vessel used for practicing the process of this invention.

As mentioned before, the terephthalic acid prepared by subjecting a dialkyl benzene such as p-xylene to a liquid-phase oxidation by an ordinary method contains various impurities, e.g., by reaction intermediate products and by-products such as 4-carboxybenzaldehyde and p - toluylic acid, in other words, fiber grade terephthalic acid cannot be obtained directly by an ordinary liquid-phase oxidation of p-xylene. This is because although the reactants in the reaction system may be dispersed and mixed to some extent by means of a stirrer, the dispersing and mixing of the reactants are insufficient by an ordinary stirring operation even if the stirring is conducted sufficiently.

However, as the result of investigations of a process for conducting the smooth and quick contact and mixing of the reactants for obtaining high quality terephthalic acid at a good yield, the inventors have discovered that it is quite effective, for increasing the quality and the yield of the terephthalic acid, to supply the feed material, p-xylene, into the reaction system through at least three inlets disposed at different or separated positions in the vertical direction in the reaction system so that the concentration of the p-xylene becomes homogeneous throughout the whole reaction zone in the vertical direction.

Generally, it is considered to be effective for promoting the oxidation reaction of p-xylene and an oxygen gas as the oxidizing agent by uniformly and quickly mixing them to employ a means of distributing plural said inlets for p-xylene in a horizontal direction in the reaction system and supplying p-xylene into the reaction system through the inlets so that the feed material is dispersed therein in a uniform concentration since in such a case the feed material is mixed uniformly and in a uniform depth with an oxygen gas introduced from the lower portion of the reaction system which is rising through the reaction zone. Thus the above means is practically considered to be more effective for improving the quality and the yield of terephthalic acid produced. However, in fact, the means of supplying the feed material, p-xylene, into the reaction system through plural inlets distributed in the horizontal direction in the reaction system hardly contributes to improve the quality and the yield of terephthalic acid. On the other hand, the fact that only the means of supplying the feed material into the reaction system through plural inlets distributed in the vertical direction in the reaction system is quite effective for improving the quality and the yield of the terephthalic acid is an unexpected fact discovered first by the inventors of the present invention.

For example, not only in the case of supplying p-xylene into the reaction system through only one inlet as in a conventional method such as a method disclosed in the specification of U.S. Patent No. 3,064,044, but also the case of supplying p-xylene into the reaction system through at least three inlets distributed in the horizontal direction in the reaction vessel without distributing them in the vertical direction as in the present invention, fiber grade terephthalic acid cannot be obtained.

In the present invention it is necessary to supply p-xylene into the reaction system through at least three inlets distributed in the vertical direction. Even in the case of supplying p-xylene into the reaction system through two inlets distributed in the vertical direction, the quality and the yield of terephthalic acid may be considerably improved as compared with the case of supplying the whole amount of p-xylene through only one inlet as in the conventional method but it is not always sufficient for obtaining fiber grade terephthalic acid. That is, in order to obtain terephthalic acid having satisfactory quality at a good yield, it is necessary to employ at least three inlets for p-xylene and it is preferable to increase the number of the inlets since the quality of the terephthalic acid is more improved. However, even if the number of the inlets is increased too much, the quality of terephthalic acid will not be improved so much since the interval between the inlets in the vertical direction becomes too small by the increase of the number of inlets. Moreover, in the case of employing a large number of inlets for p-xylene, the inlet pipes each having a small inside diameter must be used to reduce the feed amount of p-xylene per inlet, and thus the crystals of the terephthalic acid formed as the reaction progresses tend to attach to the inlets and finally clog the inlets. From this point it is not desirable to increase the number of the inlets too much.

The number of inlets for p-xylene may be suitably selected on considering the quality of the product to be obtained, the supply rate of p-xylene and the diameter of the inlet. Also, the number of the inlets is influenced by the length and the diameter of the reactor to be employed. Therefore, there is no definite upper limits about the number of the inlets but usually the number is 3–20, preferably 4–10.

The inlets for p-xylene may be distributed in the reaction system by disposing in the reaction system plural pipes each having one open end so that each opening is positioned at a desired level as shown in FIG. 1 described below, or by disposing one big pipe having a proper number of perforations as the inlets for p-xylene at desired levels. Also, it is desirable for obtaining good dispersing effect of p-xylene to supply p-xylene through the inlets as near as possible to the end of the blades of a stirrer. Moreover, it is preferable to dispose the inlets so that the openings of the inlets are positioned with almost the same interval.

In the present invention it is necessary for dispersing p-xylene supplied continuously through not less than three inlets distributed in the vertical direction in the reaction system quickly and with a uniform concentration into the reaction system to conduct the oxidation reaction while stirring the reaction mixture in the reaction system. In this case, however, in order to obtain high-quality terephthalic acid by quickly and uniformly dispersing the p-xylene in the reaction liquid and conducting effectively the mixing of the reactants such as p-xylene and an oxygen gas in the reaction system, it is preferable to stir the reaction mixture by a driving power for the stirring of about 9 H.P. (horsepower) or more per 1000 gallons (3785 liters) of the reaction mixture. However, it is undesirable to increase the driving power for stirring too much since if the power for stirring becomes too high, the quality of terephthalic acid is not increased more, the loss of power and the combustion loss of solvent are, in contradistinction, increased to make the process economically disadvantageous, and also there is a problem of protecting the apparatus due to the increase in the rotation number of the stirrer. The driving power for stirring in this specification is the value of output (mechanical power) obtained by measuring the input (electric power) of an electric motor for the stirrer and calculating therefrom as the output to be substantially consumed as the power for stirring on considering the efficiency of the electric motor and the power loss.

In the reaction of this invention a cylindrical reactor of a conventional type as shown in FIG. 1 below is usually used. By supplying the raw material, p-xylene, through not less than three inlets distributed in the reaction system in the vertical or longitudinal direction of such a cylindrical reactor having a considerable length, the excellent effect or merit of this invention can be obtained. On the other hand, if other shapes of the reactor than above, e.g., a horizontally elongated reactor is employed, the merit of the present invention cannot be obtained even if not less than three inlets for p-xylene are distributed in the vertical direction in the reactor.

In order to obtain high-quality terephthalic acid by dispersing continuously p-xylene uniformly and quickly in the whole reaction zone through a plurality of inlets distributed in the vertical direction in the reaction system, it is desirable to conduct the reaction in a reactor equipped with the specific stirrer blades each having a specific blade length ($d$ shown in FIG. 1) to the diameter (D shown in FIG. 1) of the reactor ratio, i.e., having a $d/D$ ratio of 0.4–0.6. That is, various attempts have hitherto been proposed about the influence of the ratio ($d/D$) of the blade length to the diameter of reactor on the stirring state of reactants in the reactor and it is known that in the same driving power for stirrer, the optimum mixing rate of liquid reactants is in a range of a comparatively large ratio $d/D$ of about 0.6–0.7, while the optimum dispersing rate of a gaseous material in a liquid material is in a range of the comparatively small ratio $d/D$ of about 0.2–0.3.

However, as the result of investigations about the influence of the ratio $d/D$ on the stirring state of a complicated mixing system of a gas-liquid and a liquid-liquid consisting of the three components of p-xylene, a solvent-catalyst mixed liquid, and an oxygen gas, it has been found by the inventors of the present invention that the gas-liquid and liquid-liquid stirring states in the reaction system are in the most preferable states when the ratio $d/D$ is in the range of 0.4–0.6, preferably in the range of 0.4–0.5, which results in improving effectively the quality of terephthalic acid thus prepared.

In the reaction of the present invention a reactor equipped with a stirrer having more than two stages of stirring blades is preferably employed but if the interval between the stirring blades of the stirrer is too large, an unstirred portion is formed in the space between the turbulent liquid streams caused by the stirring blades, which results in making it difficult to attain quickly the uniform stirring of the whole reaction system. If the interval between the stirring blades is too narrow, the turbulent liquid streams caused by the adjacent stirring blades interfere each other to reduce the stirring effect. Accordingly, in the reaction of the present invention, it is proper to conduct the reaction in the reactor equipped with a stirrer having stirring blades arranged with a suitable interval, that is, an interval of 1–1.5 times, more preferably 1–1.2 times, the length of the stirring blade. In addition, it is preferable that the number of the stirring blades of the stirrer be as large as possible if the number is proper in the aforesaid points but the number may be selected properly on considering the interval between the stirring blades, the length of the reactor, the influence on the stirring effect, and the problems on the mechanism.

The process of the present invention may be applied to any cases of producing terephthalic acid by the liquid-phase oxidation reaction of a dialkylbenzene such as p-xylene and the preferable oxidation reaction conditions are as follows.

As the catalyst used in the process of the present invention, there are illustrated various known catalysts, for example, heavy metals such as cobalt and manganese; various compounds of these heavy metals, e.g., lower aliphatic carboxylates of them, such as cobaltous acetate, cobaltous propionate, manganese acetate, and manganese propionate; free bromine; and various bromine compounds. Besides the above catalysts, such promotors as ketones and aldehydes may be employed.

As the solvent, an aliphatic carboxylic acid having 1–8 carbon atoms, such as acetic acid, propionic acid, and butyric acid may be used, but the use of acetic acid is particularly preferable. The amount of the solvent is 2–6 times by weight the amount of p-xylene to be used as the raw material. As the oxidizing agent, an oxygen gas or an oxygen-containing gas having an oxygen concentration of more than 7% by volume may be used, but the use of air is economically advantageous. The amount of the oxygen gas to p-xylene is in the range of 3–500, preferably 5–300 mols per mol of p-xylene.

The reaction temperature of the reaction in this invention is generally 80–230° C., preferably 130–200° C. Moreover, because the reaction is conducted in the liquid phase, it is required to conduct the reaction under pressure so that the p-xylene and the solvent are maintained in the liquid phase. The preferable range of the reaction pressure is 2–30 kg./cm.$^2$. The mean retention time of the reaction mixture is 0.5–6 hours, preferably 1–2 hours. The reaction of the present invention may be carried out by a continuous system or a semi-continuous system.

Now, an embodiment of the present invention is explained for the continuous case illustrated in FIG. 1 of the accompanying drawing.

A definite amount of the mixture of a solvent and a catalyst is supplied into a reaction vessel 1 through a conduit 4 and the reaction system is heated and pressed to a predetermined temperature and pressure. When the reaction system attains the predetermined temperature and pressure, while rotating stirring blades 2a–2d by means of an electric motor 12 at a definite rotation number, the raw material, p-xylene, a mixture of the solvent and the catalyst, and an oxygen-containing gas are supplied continuously into the reaction system through inlet pipes 3a–3d, the conduit 4, and a conduit 5 respectively at predetermined rates to conduct the reaction of them. In addition, instead of supplying through the conduit 4, the mixture of the solvent and the catalyst may be supplied through the conduits 3a–3d together with the p-xylene. This modification is preferable because the amount of liquids supplied through each opening of the inlet pipes 3a–3d is increased and thus the clogging of the opening of the inlet pipe by the attaching of the crystals of terephthalic acid can be prevented. The gaseous materials generated during the reaction are withdrawn from a conduit 6 at the top of the reaction vessel 1. The gaseous materials are cooled in a condenser 7 and then introduced in a tank 8, from which non-condensed gases are withdrawn from the reaction system through a conduit 9, while the condensed liquid is recycled into the reaction vessel 1 through a conduit 10 for controlling the temperature of the reaction system and for reuse of the solvent. In addition, a buffer plate 13 may be provided, if necessary, for promoting the stirring effect.

The reaction product after a definite residence time is withdrawn from a conduit 11 at the bottom of the reaction vessel 1 continuously at a definite rate so that the liquid level of the reaction mixture in the reaction vessel is maintained always constant. The reaction product withdrawn from the reaction vessel is separated into a solid component and a liquid component by an ordinary manner such as a centrifugal separation, filtration, etc. and terephthalic acid thus obtained is washed with acetic acid or water.

As mentioned before in detail, the terephthalic acid prepared by the process of the present invention can provide a high-quality polyester suitable as a raw material for preparing synthetic fibers by the direct polymerization reaction with ethylene glycol or ethylene oxide. Thus, according to the process of this invention, fiber grade terephthalic acid can be produced at a high yield directly by only the oxidation reaction step of employing the simple improvement that p-xylene is supplied into the reaction system through a plurality of inlets distributed in the vertical direction of the reaction vessel without the necessity of employing complicated purifying steps and thus it will be understood that the process of this invention has large industrial and economic advantages.

Now, the process of this invention is illustrated by the following examples but these examples are intended merely to illustrate the purpose of the invention and are not intended to limit the scope of the invention.

EXAMPLE 1

In a titanium-lined reaction pressure vessel 1 equipped with a stirrer having four stages of stirring blades 2a–2d (each being a plate type, composed of four blades, and the length of the blades being 1000 mm.) arranged with an interval of 1000 mm. (the ratio $l/d$ being 1); four inlets 3a–3d for p-xylene distributed with a suitable interval each other in the vertical direction in the reaction system; a conduit 4 for supplying a solvent-catalyst mixture; an inlet 5 for an oxygen-containing gas; an outlet pipe 6 for discharging gaseous product; an outlet 12 for withdrawing the reaction product; and a buffer plate 13 as shown in FIG. 1 of the accompanying drawing (said reaction vessel having an inside volume of 20 m.$^3$ and an inside diameter of 2000 mm.) were charged 6 tons of acetic acid, 65.4 kg. of cobalt acetate (tetrahydrate), 1.3 kg. of manganese acetate (tetrahydrate), and 18 kg. of sodium bromide and after heating the reaction system to 190° C., the pressure of the reaction system was increased to 20 kg./cm.$^2$, by an inert gas and then air and p-xylene were supplied continuously into the reaction system to conduct the oxidation reaction of p-xylene. In this case, p-xylene was supplied through four inlets disposed near the stirring blades for 100 minutes at a rate of 300 kg./hr. each (total amount of p-xylene was 1.2 tons/hr.). Also, air was blown into the reaction system at a rate of 4.2 Nm.$^3$ per kilogram of p-xylene. The reaction was conducted while rotating the stirrer at a rate of 100 r.p.m. by a driving power of 9 H.P. per 1000 gallons (3785 liters) of the reaction mixture. After the reaction was over, the reaction product was withdrawn from the outlet of the reaction vessel and after subjecting the reaction product to a solid-liquid separation, the product was washed with acetic acid. The properties and the yield of the terephthalic acid thus obtained are shown in Table 1.

EXAMPLE 2

The same procedure as Example 1 was followed except that p-xylene was supplied for 100 minutes through three inlets disposed near the three stirring blades lacking in the lowermost stirring blade of the same apparatus in Example 1 at a rate of 400 kg./hr. each (total amount of p-xylene was 1.2 tons/hr.). The properties and the yield of the terephthalic acid thus obtained are also shown in Table 1.

EXAMPLE 3

The oxidation reaction of p-xylene was conducted continuously in a reaction vessel equipped with a stirrer having arranged four stages of blades each having a length of 800 mm. with an interval of 1.2 times the length of the stirring blades (the ratio of the blade length to the diameter of the reaction vessel, $d/D$ was 0.4) by supplying a catalyst-solvent mixture (consisting of 6 tons of acetic acid, 65.4 kg. of cobaltous acetate tetrahydrate, 1.3 kg. of manganese acetate tetrahydrate, and 18 kg. of sodium bromide) at a rate of 4.8 tons/hr.; p-xylene through six inlets of which four inlets were disposed near the stirring blades and two inlets were disposed in the spaces between the first and second stages of stirring blades and between the second and third stages of stirring blades respectively at a rate of 267 kg./hr. each (total amount of p-xylene was 1.6 tons/hr.); and air at a rate of 4.2 Nm.$^3$ per kilogram of the p-xylene, under the reaction conditions of 190° C. reaction temperature, 20 kg./cm.$^2$ reaction pressure, and 75 minutes mean residence time, while rotating the stirrer at a rate of 145 r.p.m. by a driving power of 9 H.P. per 1000 gallons (3785 liters). During the reaction, the reaction product was continuously withdrawn from the reaction vessel at a constant rate so that the liquid level of the reaction system was maintained at a definite level. When the reaction reached steady state, the reaction product withdrawn from the outlet of the reaction vessel was subjected to a solid-liquid separation and then the product was washed with acetic acid. The properties and the yield of the terephthalic acid thus obtained are shown in Table 1.

EXAMPLE 4

The same procedure as Example 3 was followed except that a mixture of 1.6 tons/hr. of p-xylene and 4.8 tons/hr. of the catalyst-solvent mixture having the same composition as in Example 3 was supplied into the reaction system through eight inlets of which four inlets were disposed near the four stirring blades, three inlets were disposed in the spaces between the inlets, and one stirring blade was disposed at the upper portion of the first stage of the stirring blade (the amount of p-xylene supplied through one inlet was 200 kg./hr.). The properties and the yield of the terephthalic acid thus obtained are shown in Table 1.

COMPARATIVE EXAMPLE 1

The same procedure as in Example 1 was followed using the same reaction vessel as in Example 1 except that p-xylene was supplied through only one inlet disposed near the second stage of the stirring blade at a rate of 1.2 tons/hr. The properties and the yield of the terephthalic acid thus obtained are shown in Table 1.

COMPARATIVE EXAMPLE 2

The same procedure as Example 1 was followed using the same apparatus as in Example 1 except that p-xylene was supplied through two inlets disposed near the first stage and third stage of the stirring blades at a rate of 600 kg./hr. each (the total amount of p-xylene was 1.2 tons/hr.). The properties and the yield of the terephthalic acid thus prepared are shown in Table 1.

COMPARATIVE EXAMPLE 3

The same procedure was followed using the same reaction vessel as in Example 1 except that p-xylene was supplied into the reaction system from four inlets disposed near the second of the stirring blade at the same height wtih an angle of 90° to each other at a rate of 300 kg./hr. each (the total amount of p-xylene was 1.2 tons/hr.). The properties and the yield of the terephthalic acid thus obtained are shown in Table 1.

COMPARATIVE EXAMPLE 4

The same procedure as Example 3 was followed using the same reaction vessel as in Example 3 except that p-xylene was supplied into the reaction system through one inlet disposed near the second stage of the stirring blade at a rate of 1.6 tons/hr. The properties and the yield of the terephthalic acid thus obtained are shown in Table 1.

TABLE 1

|  | 1 | 2 | 3 | 4 | 5 | 6 | 7 | 8 | 9 | 10 | 11 |
|---|---|---|---|---|---|---|---|---|---|---|---|
| Example: |  |  |  |  |  |  |  |  |  |  |  |
| 1 | 4 | 9 | 0.5 | 1 | 1.2 | 99.95 | 420 | <0.01 | −0.5 | Colorless | 95 |
| 2 | 3 | 9 | 0.5 | 1 | 1.2 | 99.95 | 450 | <0.01 | −0.5 | do | 95 |
| 3 | 6 | 9 | 0.4 | 1.2 | 1.6 | 99.95 | 470 | <0.01 | −0.1 | do | 95 |
| 4 | 8 | 9 | 0.4 | 1.2 | 1.6 | 99.95 | 440 | <0.01 | −0.3 | do | 95 |
| Comparative Example: |  |  |  |  |  |  |  |  |  |  |  |
| 1 | 1 | 9 | 0.5 | 1 | 1.2 | 99.8 | 1,000 | 0.04 | +3.0 | Faint yellow | 92 |
| 2 | 2 | 9 | 0.5 | 1 | 1.2 | 99.93 | 600 | 0.02 | +1.0 | Light yellow | 93 |
| 3 | *4 | 9 | 0.5 | 1 | 1.2 | 99.92 | 700 | 0.03 | +2.0 | do | 93 |
| 4 | 1 | 9 | 0.4 | 1.2 | 1.6 | 99.8 | 1,500 | 0.06 | +4.5 | Yellow | 91 |

* Distributed in a horizontal direction in the reaction vessel.

NOTE.—1=Number of inlets for supplying p-xylene; 2=Driving power for stirring (H.P./1,000 gallons); 3=Ratio of the length of stirring blade to the diameter of the reaction vessel (d./D.); 4=Ratio of the interval between stirring blades to the length of the stirring blade (l./d.); 5=Supplying rate of p-xylene (ton/hr.); 6=Purity (wt. percent); 7=Content of 4-carboxybenzaldehyde (p.p.m.); 8=Molar extinction coefficient (at $\epsilon$ 380 m.u.);[1] 9=Color difference (b-value);[2] 10=Color of polymer;[3] 11=Yield (percent).[4]

[1] The molar extinction coefficient is a value obtained by dissolving 5 g. of terephthalic acid in 100 ml. of 2 N aqueous ammonia and measuring the absorption spectrum of the solution at 380 m.u. by means of a spectrophotometer. The color is better as the value is smaller.

[2] The color difference (b-value) is an external appearance observed by measuring the reflected light from the solid terephthalic acid by means of a Color Difference Meter CM-20 Type (made by Color Machine Co.) and the b-value shows yellow (+) to blue (−). In the range of the experimental results of this invention, the color of terephthalic acid is better as the value is smaller.

[3] The color of polymer: The color of the polymer prepared by the direct polymerization of the terephthalic acid produced and ethylene glycol of a well-known method, e.g., a method described in the specification of U.S. Patent No. 3,050,533 is observed by the naked eye and the color is compared with the color of a standard sample preliminarily prepared. The color is classified into the five grades colorless, light yellow, faint yellow, yellow and brown yellow. The test is ordinarily used to evaulate the thermal stability of a small amount of impurities in terephthalic acid and the color of the polymeris denser as the property of the polymer is worse. The colorlessness of the polymer shows that the terephthalic acid can be used as the raw material for the direct polymerization.

[4] The yield is a theoretical yield to the p-xylene employed.

What is claimed is:

1. In a process for producing fiber grade terephthalic acid by oxidizing in a reaction vessel p-xylene in a liquid state with molecular oxygen or a molecular oxygen-containing gas in the presence of a lower aliphatic carboxylic acid type solvent and a heavy metal containing oxidizing catalyst, the improvement which comprises conducting said liquid-phase oxidation reaction in a vertically-elongated reaction vessel while supplying continuously p-xylene into the reaction system through at least three inlets for p-xylene distributed at differing heights in the vertical direction of the reaction vessel and stirring the reactants.

2. The process as claimed in Claim 1 wherein p-xylene is supplied into the reaction system through at least four inlets, each of said inlets being separated by the same height interval.

3. The process as claimed in Claim 1 wherein said solvent is acetic acid.

4. The process as claimed in Claim 1 wherein said solvent is used in an amount of 2–6 times by weight the amount of the p-xylene.

5. The process as claimed in Claim 1 wherein the heavy metal component of the catalyst is cobalt and manganese.

6. The process as claimed in Claim 1 wherein said catalyst contains cobalt, manganese and bromine.

7. The process as claimed in Claim 1 wherein said molecular oxygen-containing gas is air.

8. The process as claimed in Claim 1 wherein the reaction is conducted at a temperature of 80–230° C.

9. The process as claimed in Claim 1 wherein the reaction is conducted at a pressure sufficient for maintaining the p-xylene and the solvent in a liquid phase at the reaction temperature.

10. In a process for producing fiber grade terephthalic acid by oxidizing in a reaction vessel p-xylene in a liquid phase with molecular oxygen or a molecular oxygen-containing gas in the presence of a lower aliphatic carboxylic acid type solvent and a heavy metal-containing oxidizing catalyst, the improvement which comprises conducting said liquid-phase oxidation reaction in a vertically-elongated reaction vessel while supplying p-xylene into the reaction system through at least three inlets, each of said inlets being distributed at differing heights in the vertical direction in the reaction vessel, and stirring the reactants by a driving power for stirring of not less than 9 H.P. per 1000 gallons (3785 liters) of the reaction mixture.

11. The process as claimed in Claim 10 wherein p-xylene is supplied through at least four inlets, each of said inlets being separated by the same height interval.

12. The process as claimed in Claim 10 wherein said solvent is acetic acid.

13. The process as claimed in Claim 10 wherein p-xylene is supplied in an amount of 6–2 times by weight the amount of the solvent.

14. The process as claimed in Claim 10 wherein the heavy metal component of the catayst is cobalt and manganese.

15. The process as claimed in Claim 10 wherein said catalyst contains cobalt, manganese and bromine.

16. The process as claimed in Claim 10 wherein said reaction is conducted at a reaction temperature of 80–230° C., and at a pressure sufficient for maintaining p-xylene and the solvent in a liquid phase at the reaction temperature.

17. In a process for producing fiber grade terephthalic acid by oxidizing in a reaction vessel p-xylene in a liquid phase with molecular oxygen or a molecular oxygen-containing gas in the presence of a lower aliphatic carboxylic acid type solvent and a heavy metal-containing oxidizing catalyst, the improvement which comprises conducting the liquid-phase oxidation in a vertically-elongated reaction vessel equipped with a multi-stage stirrer, the ratio of the length of the stirring blade to the diameter of said reaction vessel being in a range of 0.4:1 to 0.6:1 and said multi-stage stirring blades being arranged with an interval of a range of 1–1.5 times the length of said stirring blade, while supplying continuously p-xylene into the reaction system through at least three inlets, each of said inlets being distributed at differing heights in the vertical direction in the reaction system and stirring the reactants by a driving power for stirring of not less than 9 H.P. per 1000 gallons of the reaction mixture.

18. The process as claimed in claim 17 wherein the ratio of the length of the stirring blade to the diameter of the reaction vessel is in a range of 0.4:1 to 0.5:1.

19. The process as claimed in Claim 17 wherein the interval of said stirring blades is in a range of 1–1.2 times the length of the stirring blade.

20. The process as claimed in Claim 17 wherein p-xylene is supplied through at least four inlets, each of said inlets being separated by the same height interval.

21. The process as claimed in Claim 17 wherein said solvent is acetic acid.

22. The process as claimed in Claim 17 wherein said solvent is used in an amount of 2–6 times by weight the amount of p-xylene.

23. The process as claimed in Claim 17 wherein the heavy metal component of the catalyst is cobalt and manganese.

24. The process as claimed in Claim 17 wherein said catalyst contains cobalt, manganese and bromine.

25. The process as claimed in Claim 1 wherein said reaction is conducted at a reaction temperature of 80–230° C., and at a pressure sufficient for maintaining p-xylene and the solvent in a liquid phase at the reaction temperature.

26. The process as claimed in Claim 1 wherein the reaction is conducted at a temperature of 130–200° C.

27. The process as claimed in Claim 10 wherein said reaction is conducted at a reaction temperature of 130–200° C.

28. The process as claimed in Claim 1 wherein said reaction is conducted at a reaction temperature of 130–200° C. and at a pressure sufficient for maintaining p-xylene and the solvent in a liquid phase at the reaction temperature.

References Cited
UNITED STATES PATENTS

| | | | |
|---|---|---|---|
| 3,313,849 | 4/1967 | List et al. | 260—524 |
| 2,752,224 | 6/1956 | Joria | 23—260 |
| 2,371,477 | 3/1945 | Souders et al. | 23—260 |

LORRAINE A. WEINBERGER, Primary Examiner

R. D. KELLY, Assistant Examiner

U.S. Cl. X.R.

23—283